US012352282B2

(12) United States Patent
Tuomisalo

(10) Patent No.: US 12,352,282 B2
(45) Date of Patent: Jul. 8, 2025

(54) WEAR ELEMENT FOR A SLURRY PUMP

(71) Applicant: Metso Outotec Sweden AB, Trelleborg (SE)

(72) Inventor: Aki Tuomisalo, Espoo (FI)

(73) Assignee: Metso Sweden AB, Malmo (SE)

( * ) Notice: Subject to any disclaimer, the term of this patent is extended or adjusted under 35 U.S.C. 154(b) by 0 days.

(21) Appl. No.: 18/547,775

(22) PCT Filed: Mar. 8, 2022

(86) PCT No.: PCT/EP2022/055818
§ 371 (c)(1),
(2) Date: Aug. 24, 2023

(87) PCT Pub. No.: WO2022/189395
PCT Pub. Date: Sep. 15, 2022

(65) Prior Publication Data

US 2024/0133395 A1 Apr. 25, 2024
US 2024/0229817 A9 Jul. 11, 2024

(30) Foreign Application Priority Data

Mar. 9, 2021 (EP) .................................... 21161576

(51) Int. Cl.
*F04D 29/22* (2006.01)
*F04D 7/04* (2006.01)
(Continued)

(52) U.S. Cl.
CPC ........... *F04D 29/2294* (2013.01); *F04D 7/04* (2013.01); *F04D 29/026* (2013.01); *F04D 29/4286* (2013.01); *F05D 2300/507* (2013.01)

(58) Field of Classification Search
CPC ...... F04D 29/2294; F04D 7/04; F04D 29/026; F04D 29/4286; F04D 29/708; F04D 29/426; F05D 2300/507
See application file for complete search history.

(56) References Cited

U.S. PATENT DOCUMENTS

2003/0044272 A1* 3/2003 Addie ................. F04D 29/2294 415/206
2007/0014662 A1* 1/2007 Burgess .............. F04D 29/4286 415/197

(Continued)

FOREIGN PATENT DOCUMENTS

CN 104533798 A 4/2015
CN 105402139 A * 3/2016

(Continued)

OTHER PUBLICATIONS

Ashkan, Dargahi; Ramin, Sedaghati; Subhash, Rakheja; "On the properties of magnetorheological elastomers in shear mode: Design, fabrication and characterization", 2018, Elsevier, Composites Part B, vol. 159, pp. 269-283. (Year: 2018).*

(Continued)

*Primary Examiner* — Woody A Lee, Jr.
*Assistant Examiner* — Eric A Lange
(74) *Attorney, Agent, or Firm* — Andrus Intellectual Property Law, LLP

(57) ABSTRACT

A wear element for a slurry pump. At least a portion of the wear element produces a magnetic field for attracting magnetic particles in a slurry processed by the slurry pump. The wear element includes a magnet arranged to generate a protective wear layer on a surface of the wear element. The slurry pump includes a pump housing and a wear element within the pump housing. At least a portion of the wear element produces a magnetic field for attracting magnetic particles present in a slurry processed by the slurry pump. A protective wear layer is formed in a slurry pump by arranging a wear element in a housing of the slurry pump. At least a portion of the wear element produces a magnetic field. A slurry including magnetic particles is pumped through the (Continued)

slurry pump and the magnetic particles are attracted by the magnetic field to create the protective wear layer.

15 Claims, 3 Drawing Sheets

(51) Int. Cl.
*F04D 29/02* (2006.01)
*F04D 29/42* (2006.01)

(56) References Cited

U.S. PATENT DOCUMENTS

| | | | | |
|---|---|---|---|---|
| 2011/0142610 | A1* | 6/2011 | Burgess | F04D 7/04 415/204 |
| 2011/0158795 | A1* | 6/2011 | Burgess | F04D 7/04 415/191 |

FOREIGN PATENT DOCUMENTS

| | | | | |
|---|---|---|---|---|
| DE | 2248534 | A1 * | 10/1972 | |
| EP | 0240674 | A2 * | 2/1987 | F04D 13/06 |
| EP | 1353074 | A2 * | 10/2003 | F04D 13/0633 |
| EP | 2735744 | A2 | 5/2014 | |
| SU | 1121504 | A * | 10/1984 | |
| WO | WO-2018000032 | A1 * | 1/2018 | F01D 11/08 |

OTHER PUBLICATIONS

International Search Report and Written Opinion for International Application No. PCT/EP2022/055818, mailed May 20, 2022.

International Preliminary Report on Patentability for International Application No. PCT/EP2022/055818, mailed Feb. 2, 2023.

Office Action for Chinese Patent Application No. 202210220573X, issued Jan. 23, 2025.

* cited by examiner

WEAR ELEMENT FOR A SLURRY PUMP

CROSS-REFERENCE TO RELATED APPLICATIONS

This application is the U.S. national stage application of International Application PCT/EP2022/055818, filed Mar. 8, 2022, which international application was published on Sep. 15, 2022, as International Publication WO 2022/189395 A1 in the English language. The International Application claims priority European Patent Application No. 21161576.0 filed Mar. 9, 2021.

FIELD OF THE DISCLOSURE

The present disclosure relates to a wear element for a slurry pump, a slurry pump comprising such a wear element, and to a method for producing a protective wear layer in a slurry pump.

BACKGROUND ART

Centrifugal pumps are known in the art for pumping fluids and can be used for different applications, such as for transporting and processing slurries. Typically, centrifugal pumps comprise an impeller supported on a shaft which is rotated by an external motor. The impeller is housed within a pump housing having an inlet for fluid and an outlet for discharging the pumped fluid, commonly referred to as the discharge. In use, fluid from the inlet flows to the centre of the impeller, whereby the rotation of the impeller forces the fluid towards the peripheral regions of the housing to be discharged through the outlet.

A challenge with centrifugal pumps used for transporting and processing slurry, also referred to herein as slurry pumps, is that parts of the pump which enter into contact with the transported slurry experience high wear due to abrasive particles present in the slurry. Slurry pumps typically comprise one or several wear elements made of a wear resistant material, which are exchangeable and, thus, replaceable when excessively worn. One type of slurry pumps comprises wear elements made of metal. For example, the casing may typically be made of a high chrome steel. Similarly, the impeller is often also made from metal and can also be considered to constitute a wear element of a slurry pump. Another type of slurry pump comprises wear elements made of a polymer, such as liner elements which are commonly made of rubber. Wear is, however, a problem both for full metal slurry pumps and for polymer lined slurry pumps, and the worn parts need to be exchanged frequently, leading to undesirable maintenance down time.

To avoid stops in the processing of slurry, two centrifugal pumps are commonly provided such that one pump can be in operation while the other pump is subjected to maintenance. This requires high investment costs for setting up a processing line for slurries.

SUMMARY

It is an object to mitigate, alleviate or eliminate one or more of the above-identified deficiencies in the art and disadvantages singly or in any combination and solve at least the above-mentioned problem. According to a first aspect there is provided a wear element for a slurry pump arrangeable in a pump housing, wherein at least a portion of the wear element produces a magnetic field for attracting magnetic particles in a slurry processed by the slurry pump. According to an embodiment, the wear element comprises a magnet for producing the magnetic field, arranged such to generate formation of a protective wear layer on a surface of the wear element when used in a slurry pump.

The wear element may be advantageous as the attraction of magnetic particles in a slurry processed by the slurry pump in which the wear element is arrangeable, will cause magnetic particles to stick to the surface of the wear element, thereby forming a layer thereon. Such a layer will act as an autogenous layer and, thus, protect the wear element from being worn by abrasive particles present in the slurry. The durability of the wear element is thereby significantly improved. The magnetic field may be produced by one or several magnets, e.g. permanent magnets, or electromagnets, comprised by the wear element. Thus, according to some embodiments, the wear element comprises magnets in at least portions thereof for attracting magnetic particles in a slurry processed by the slurry pump. According to some embodiments, the wear element comprises permanent magnets in at least portions thereof for producing the magnetic field. Permanent magnets produce a strong magnetic field and may be applied in any type of material, such as polymer and metal material. By arranging permanent magnets in the wear element in at least portions thereof, the wear element can be tailored to generate a protective wear layer at specific portions particularly susceptible for wear when arranged in a slurry pump. This provides a cost-efficient wear element. A uniform distribution of the permanent magnets in the wear element provides homogeneous wear protection of the wear element during use in a slurry pump. The permanent magnets may be lined with a thin polymer layer according to some embodiments. It is also possible to arrange permanent magnets directly in the wear element, without a polymer lining.

According to some embodiments, the wear element comprises a casing liner of a slurry pump. The casing liner of a slurry pump generally comprises at least a peripheral portion and may also be referred to as the peripheral liner. The casing liner can also include one of a back portion, often referred to as the back liner, a front portion, and a front liner. Thus, the casing liner can be integrated with one or both of the front liner and the back liner of a pump. When comprising a front portion or the front liner, and the back liner, the wear element is U shaped. The casing liner comprising the peripheral portion, the back liner, and the front liner may thus be provided as a single piece. The casing liner may also be provided as a peripheral liner only, with or without a front portion, or with the peripheral portion integrated with only one of the back liner and the front liner. The wear element may thus comprise at least one of a front liner, a back liner, and a casing liner. In an example, the portion of the wear element producing a magnetic field is the casing liner comprising only a peripheral portion. When arranged in a slurry pump, the casing liner will attract magnetic particles of the slurry processed by the slurry pump, which will stick to the surface thereof and thereby create a protective layer on the casing liner, preventing the same from being worn. In another example, the portion of the wear element producing a magnetic field is the front liner. In yet another example, the portion of the wear element producing a magnetic field is the back liner. In a further example, portions of the wear element producing a magnetic field are the front liner and the peripheral and front portions of the casing liner. It is thus clear for the skilled person that, in view of the present disclosure, the portion of the wear element producing a magnetic field may be all or any portion of the casing liner, the front liner, and the back liner, or any portion thereof.

According to some embodiments, the wear element comprises a suction liner. The suction liner of a slurry pump is generally subjected to significant amounts of wear by the particles present in the slurry processed by the pump. Particularly, the portion facing the impeller, also referred to as the flange portion, is prone to wear. The flange portion is also commonly referred to as a front liner. Providing at least a portion of the suction liner that produces a magnetic field, e.g. by inserting permanent magnets in the suction liner and particularly in portions susceptible to wear such as the flange portion, enhances the durability of the suction liner, which is advantageous.

According to some embodiments, the wear element comprises a pump impeller. This is advantageous in that magnetic particles passing by the pump impeller during use are attracted to the portions producing a magnetic field, thereby generating a protective wear layer on such portions of the pump impeller. The pump impeller may be tailored to produce a magnetic field, or several magnetic fields at portions of the pump impeller generally susceptible to wear during use in a slurry pump. Within the context of the present disclosure, it is also possible to provide a pump impeller that produces a magnetic field or several magnetic fields, for example by arranging magnets therein, uniformly distributed over the entire pump impeller.

According to some embodiments, the wear element is made of metal. That is, a wear element comprising for example a casing liner, a suction liner, or a pump impeller is made of metal. Casing liners and suction liners for slurry pumps are commonly made of metal such as high chrome iron. Such casing liners are not replaceable as such, instead the entire casing is typically made of metal and needs to be replaced when excessively worn. By introducing permanent magnets in such parts, e.g. close to the surface of the casing which is contacted by a slurry during use of the wear element in a slurry pump, a magnetic field is produced which attracts magnetic particles passing by the wear element, causing the particles to stick to the surface and thereby generating a protective wear layer on the wear element, or the portion of the wear element producing the magnetic field.

According to some embodiments, the liner is made of polymer. That is, a wear element comprising a casing liner, or a suction liner is made of polymer. In slurry pumps, it is common to provide casing and sutions liners of a polymer material such as rubber. Providing the liner in another polymer material is also possible within the context of the present disclosure. By introducing magnets in such liners, e.g. close to the surface of the liner, a magnetic field is produced which attracts magnetic particles passing by the liner, causing the particles to stick to the surface and thereby generating a protective wear layer on the liner, or on the portion of the liner producing the magnetic field. For wear elements made of polymer, permanent magnets or electromagnets may be used in portions to produce the magnetic field.

According to some embodiments, permanent magnets are embedded in the wear element and arranged end to end. By arranging permanent magnets end to end, a uniform distribution of the magnets and, thus, of the generated protective layer on the wear element is provided, which is advantageous.

According to some embodiments, the permanent magnets are arranged with opposing poles facing one another. This creates several smaller magnetic field arcs and provides uniform attracting forces for the magnetic particles in the slurry passing the wear element, thus generating a uniform protective layer on the wear element, which is advantageous.

According to a second aspect, there is provided a slurry pump comprising a pump housing and a wear element arranged within the pump housing, wherein at least a portion of the wear element produces a magnetic field for attracting magnetic particles present in a slurry processed by the slurry pump, and wherein the wear element comprises a magnet for producing the magnetic field, which magnet is arranged such to generate formation of a protective wear layer on a surface of the wear element when slurry is processed by the slurry pump.

Wear elements in slurry pumps generally suffer from wear and need to be frequently exchanged, leading to downtime in the process. The slurry pump may be advantageous as a wear element producing a magnetic field will attract magnetic particles, such as for example magnetite, present in the slurry processed by the pump, which will stick to the wear element and thereby form a protective autogenous layer thereon. The autogenous layer protects the wear element from being worn, thereby increasing the durability of the same and, consequently, reducing the need for maintenance.

According to some embodiments, the wear element of the slurry pump comprises magnets in at least portions thereof. According to some embodiments, the wear element of the slurry pump comprises permanent magnets in at least portions thereof. According to some embodiments, the wear element of the slurry pump comprises electromagnets in at least portions thereof.

According to some embodiments, the wear element of the slurry pump comprises at least one of a casing liner, a suction liner, and a pump impeller.

According to some embodiments, the wear element of the slurry pump is made of polymer and comprises permanent magnets embedded therein, the permanent magnets being arranged end to end with opposing poles facing one another. The permanent magnets may be embedded close to the surface of the wear element which is a surface contacted by the slurry during operation of the pump. In an embodiment, the permanent magnets are lined with a thin polymer layer. Arranging the permanent magnets end to end with corresponding poles facing one another is also possible within the concept of the present disclosure.

According to some embodiments, the wear element of the slurry pump is made of metal and comprises permanent magnets embedded therein, the permanent magnets being arranged end to end with opposing poles facing one another. Arranging the permanent magnets end to end with corresponding poles facing one another is, however, also possible within the concept of the present disclosure.

Typically, a wear element comprising a pump impeller is made of metal. In such an embodiment, permanent magnets may be embedded in portions of the pump impeller particularly subject to wear, in order to generate a protective layer on the surface of such portions. Providing permanent magnets uniformly embedded close to the surface throughout the pump impeller is also possible within the concept of the present disclosure. Wear elements comprising lining elements may also be made of metal.

According to some embodiments, the wear element of the slurry pump comprises a suction liner and the axial distance between a flange end of the suction liner and a front end of an impeller of the slurry pump, also referred to as the nose gap, prior to use of the slurry pump is from 2 to 10 mm, preferably from 3 to 8 mm, more preferably from 3 to 6 mm. The nose gap in slurry pumps is generally a problematic zone of the pump as it allows for undesired recirculation of the slurry being processed which reduces the efficiency of the pump and causes wear on the parts adjacent the nose gap, i.e. the flange end of the suction liner and the front end of the impeller, due to the abrasive particles present in the slurry that recirculates. To avoid this problem, it is generally desirable to reduce the nose gap to a maximum extent possible, generally to around 0.5 mm, or even to remove it entirely by allowing the suction liner and the pump impeller to abut against each other. This requires careful installation to adjust the nose gap properly. However, with the slurry pump comprising a wear element comprising a suction liner, at least a portion of which produces a magnetic field, as disclosed herein, the initial nose gap may be increased, considering that an autogenous layer will be generated on the suction liner during operation of the pump, which will reduce the nose gap and provide wear protection for the suction liner. This facilitates mounting of the pump while reducing wear of the suction liner.

However, depending on the type of magnets used in the flange portion of the suction liner and the type of slurry processed, providing a nose gap of from 0.5 mm is also possible within the concept of the present disclosure.

According to some embodiments, the pump housing of the slurry pump is annular. An annular shape of the pump housing is preferable for a slurry pump comprising a wear element as herein disclosed. However, providing a pump housing of another shape, such as semi-volute, is also conceivable within the concept of the present disclosure.

According to a third aspect, there is provided a method for producing a protective wear layer in a slurry pump, the method comprising the steps of arranging a wear element in a housing of the slurry pump, wherein at least a portion of the wear element produces a magnetic field and wherein the wear element comprises a magnet for producing the magnetic field; and pumping a slurry comprising magnetic particles through the slurry pump, whereby magnetic particles of the slurry are attracted by the magnetic field, thereby creating the protective wear layer on a surface of the wear element in the slurry pump.

The method for producing the protective wear layer in a slurry pump may be advantageous as it reduces wear of the slurry pumps, leading to a more efficient process with less maintenance stops, which is advantageous.

Effects and features of the second and third aspects are largely analogous to those described above in connection with the first aspect. Embodiments mentioned in relation to the first aspect are largely compatible with the second aspect and third aspects. It is further noted that the inventive concepts relate to all possible combinations of features unless explicitly stated otherwise.

A further scope of applicability of the present disclosure will become apparent from the detailed description given below. However, it should be understood that the detailed description and specific examples, while indicating preferred embodiments of the disclosure, are given by way of illustration only, since various changes and modifications within the scope of the disclosure will become apparent to those skilled in the art from this detailed description.

Hence, it is to be understood that this disclosure is not limited to the particular component parts of the device described or steps of the methods described as such device and method may vary. It is also to be understood that the terminology used herein is for purpose of describing particular embodiments only and is not intended to be limiting. It must be noted that, as used in the specification and the appended claim, the articles “a”, “an”, “the”, and “said” are intended to mean that there are one or more of the elements unless the context clearly dictates otherwise. Thus, for example, reference to “a unit” or “the unit” may include several devices, and the like. Furthermore, the words “comprising”, “including”, “containing” and similar wordings does not exclude other elements or steps.

BRIEF DESCRIPTIONS OF THE DRAWINGS

The disclosure will by way of example be described in more detail with reference to the appended schematic drawings, which show presently preferred embodiments of the disclosure.

DETAILED DESCRIPTION

The present disclosure will now be described more fully hereinafter with reference to the accompanying drawings, in which currently preferred embodiments of the disclosure are shown. This disclosure may, however, be embodied in many different forms and should not be construed as limited to the embodiments set forth herein; rather, these embodiments are provided for thoroughness and completeness, and to fully convey the scope of the disclosure to the skilled person.

Figure 1:
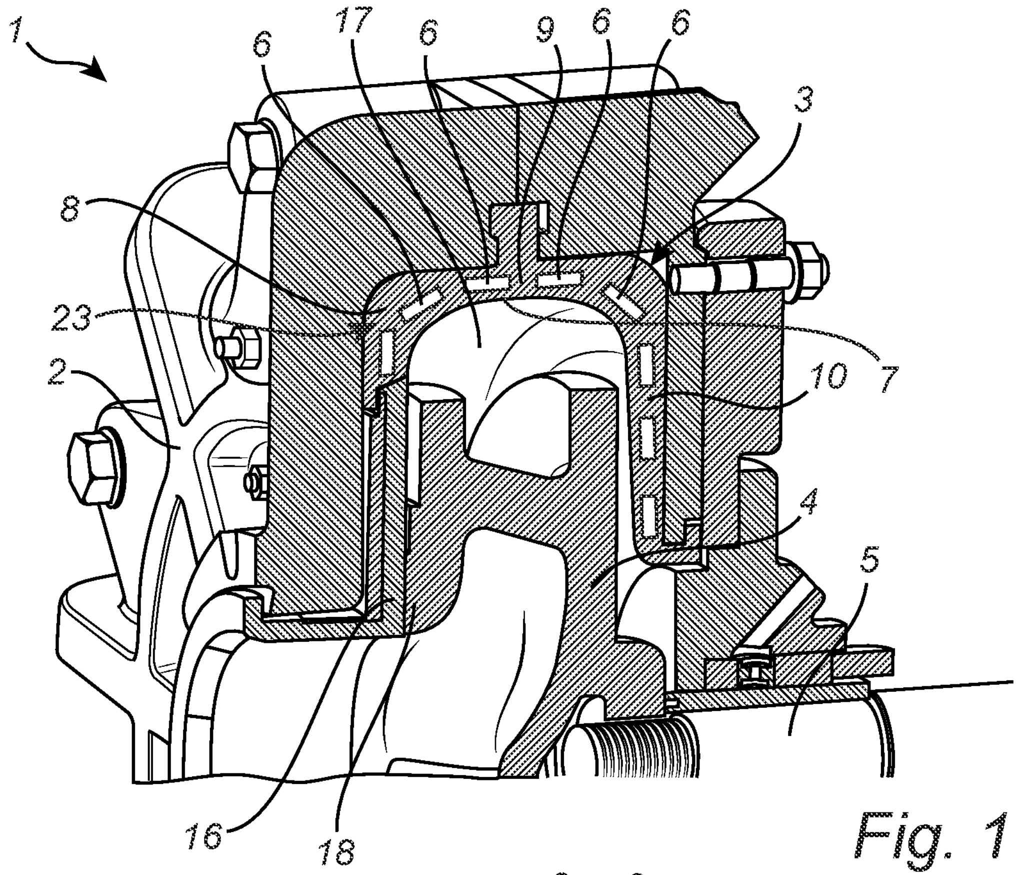
FIG. 1 shows a perspective, partly cross-sectional view of a portion of a slurry pump with a wear element according to an embodiment of the present disclosure.

FIG. 1 shows a portion of a slurry pump 1 in accordance with an embodiment of this disclosure. The slurry pump 1 comprises a pump housing 2 and a wear element 23 arranged within the pump housing 2. The slurry pump 1 further comprises an impeller 4 and an impeller shaft 5, which holds the impeller 4, and which extends through an outside of the pump housing 2. The impeller is thus also arranged within the pump housing 2.

In the embodiment shown in FIG. 1, the wear element 23 embodies a casing liner 3 of the slurry pump 1. The casing liner 3 comprises a front portion 8, a peripheral portion 9, and a back portion 10. The casing liner 3 is thus U-shaped. More particularly, the back portion 10 corresponds to the back liner of the slurry pump 1, thus the casing liner 3 is integrated with the back liner 10 of the slurry pump 1. The casing liner 3 further comprises portions that produce a magnetic field. More particularly, the casing liner 3 comprises permanent magnets 6 arranged along the surface 7 of the casing liner 3, which is a surface that is contacted by slurry during operation of the slurry pump 1. The permanent magnets 6 are here embedded in the casing liner 3 and distributed uniformly along the surface 7 of the front portion 8, the peripheral portion 9, and the back portion 10 in an end to end manner. The permanent magnets may be arranged with opposing poles facing one another, such to create a plurality of small magnetic field arcs for generating a uniform protective layer on the casing liner 3 during operation of the slurry pump 1. For a uniform distribution of the magnetic field over the casing liner 3, the permanent magnets 6 are relatively short in length. As an example, the permanent magnets 6 may be 1-10 cm long. In a preferred embodiment, the permanent magnets 6 are 2-8 cm long. In a more preferred embodiment, the permanent magnets 6 are 3-5 cm long. This allows creating a uniform protective wear layer on the wear element 23.

The space between the impeller 4 and the casing liner 3 of the slurry pump 1 is typically called the base circle 17. In the slurry pump 1 comprising the magnetic casing liner 3, the base circle 17 is deeper than that generally used for slurry pumps. This is advantageous in order to prevent the impeller 4, generally made of metal, from being affected by the magnetic field produced in portions of the casing liner 3. Increasing the depth of the base circle 17 allows radially moving particles to slow down before they contact the surface 7 of the casing liner 3, thereby minimizing aggressive particle impingement and, thus, wear of the surface 7. During use of the slurry pump 1, build-up of an autogenous layer on the magnetic casing liner 3 further protects the wear element 23 from being worn. Thus, although an increased depth of the base circle 17 of a slurry pump 1 generally leads to reduced efficiency of the pump 1, the gain obtained from the magnetic casing liner 3, reducing wear considerably, compensates for and overcomes such a drawback. However, providing a shallow base circle 17 in combination with a wear element 23 comprising at least a portion that produces a magnetic field is also possible within the concept of the present disclosure.

Figure 2:
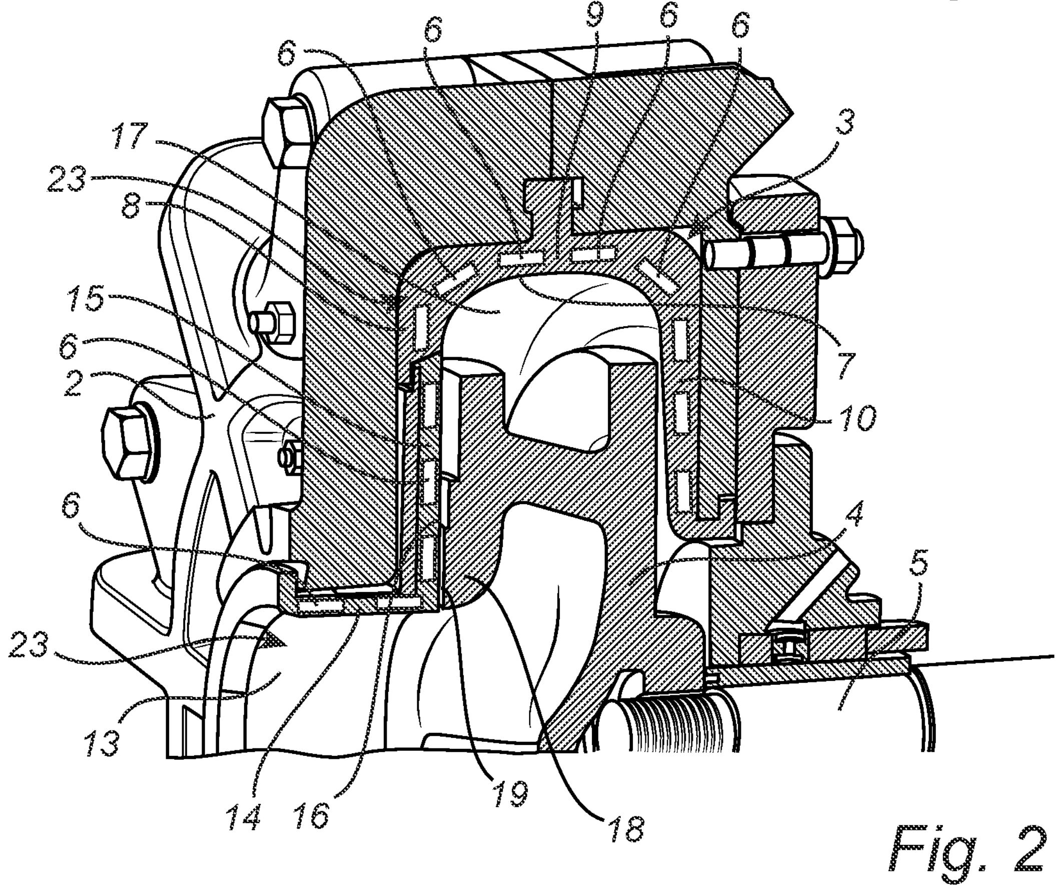
FIG. 2 shows a perspective, partly cross-sectional view of a portion of a slurry pump with a wear element according to another embodiment of the present disclosure.

FIG. 2 shows a portion of a slurry pump 1 in accordance with an embodiment of this disclosure. The slurry pump 1 of this embodiment comprises essentially the same elements as that disclosed in the embodiment shown in FIG. 1. However, in this exemplifying embodiment, the slurry pump 1 comprises several wear elements 23 comprising portions that produce a magnetic field. The wear elements 23 here comprise a casing liner 3 and a suction liner 13. The casing liner 3 is in accordance with that described with respect to FIG. 1. The suction liner 13 comprises a cylindrical portion 14 and a flange portion 15. The cylindrical portion 14 extends into the suction inlet of the slurry pump 1 and is coaxial with the impeller shaft 5. The flange portion 15 extends from the cylindrical portion 14 in a radial direction thereof and within the impeller housing 2. The flange portion 15 here corresponds to the front liner 15 of the slurry pump 1. In this embodiment, both the cylindrical portion 14 and the front liner 15 comprise permanent magnets 6 embedded therein close to the surface of the suction liner 13 which is contacted by slurry during operation of the slurry pump 1. It is possible, however, to provide permanent magnets 6 in the front liner 15 only, or in the cylindrical portion 14 only, within the context of the present disclosure. Further, the skilled person realizes that providing permanent magnets in a particular portion of the cylindrical portion 14, the flange portion 15 or of the casing liner 3, is also conceivable and in accordance with the present disclosure.

Further, a distance 19 between the flange end 16 of the suction liner 13 and the front end 18 of the impeller 4, also referred to as the nose gap 19, is shown in FIG. 2. Due to the wear element 23 comprising portions which produce a magnetic field, allowing magnetic particles passing by to stick to the surface thereof and thereby generating an autogenous layer protecting the wear element 23 from wear, the nose gap 19 can be increased at mounting. This facilitates the mounting process. During operation of the slurry pump 1, an autogenous layer will be generated on the surface of the flange end 16 of the suction liner 13, thereby reducing the nose gap 19 and, thus, recirculation of slurry within the slurry pump 1.

Figure 3:
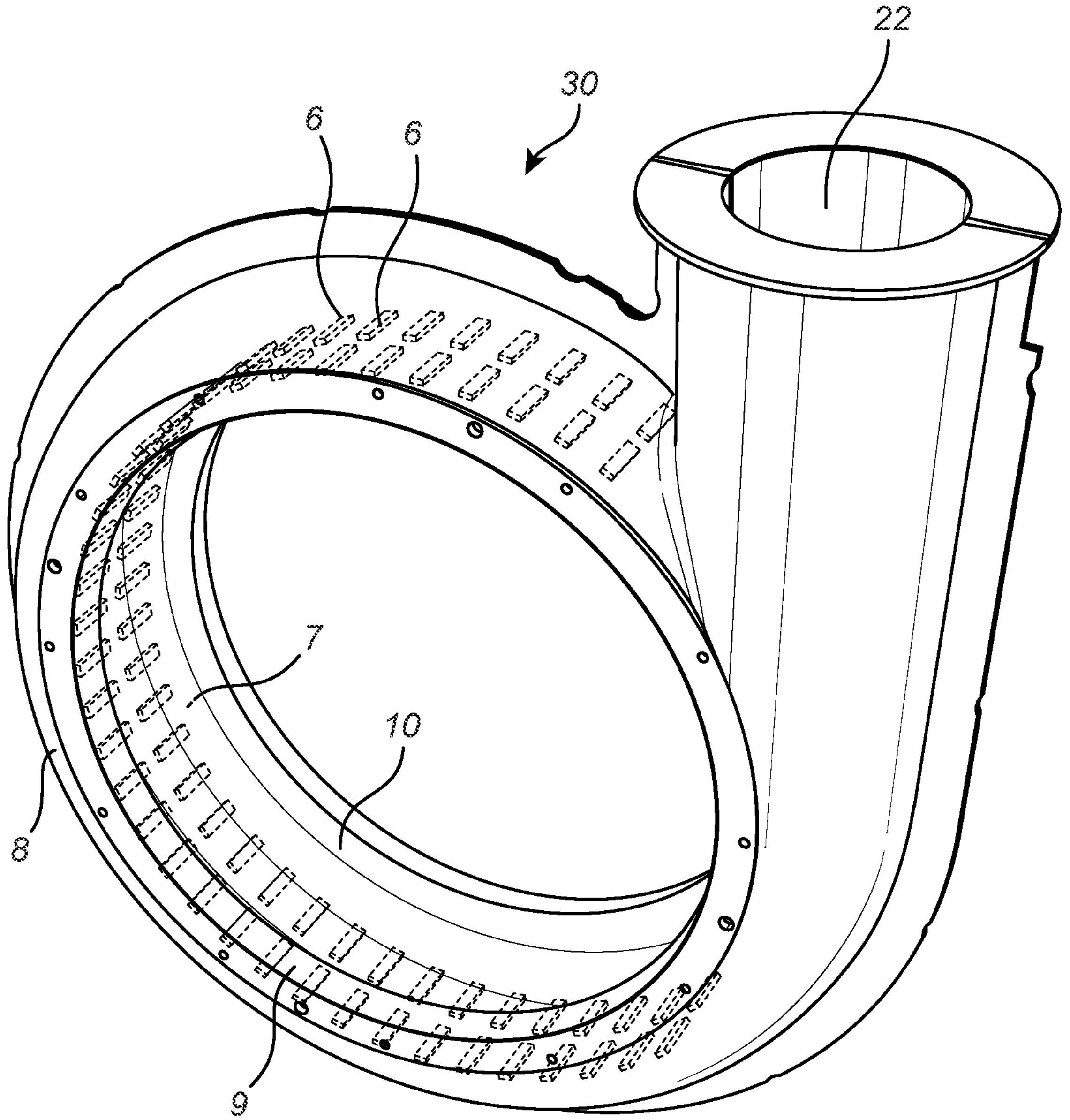
FIG. 3 shows a perspective view of a wear element according to an embodiment of the present disclosure.

FIG. 3 shows a wear element 30 according to an embodiment of this disclosure. In the embodiment shown, the wear element 30 embodies a casing liner 30 arrangeable within the housing of a slurry pump. The casing liner 30 is here made of rubber. However, providing the casing liner of another polymer material is also conceivable within the concept of this disclosure, as is providing a full metal casing liner or a liner of a composite material. The casing liner 30 comprises a front portion 8, a peripheral portion 9, and a back portion 10. Here, only the peripheral portion 9 of the casing liner 30 comprises permanent magnets 6 embedded therein. The permanent magnets 6 are distributed uniformly around the extension of the peripheral portion 9 of the casing liner 30 up to a discharge portion 22 of the casing liner. Thus, when arranged in a pump housing of a slurry pump processing a slurry comprising magnetic particles, the permanent magnets 6 will attract magnetic particles of the slurry to stick to the surface 7 of the peripheral portion 9 of the casing liner 30, thereby forming a protective wear layer thereon.

Figure 4:
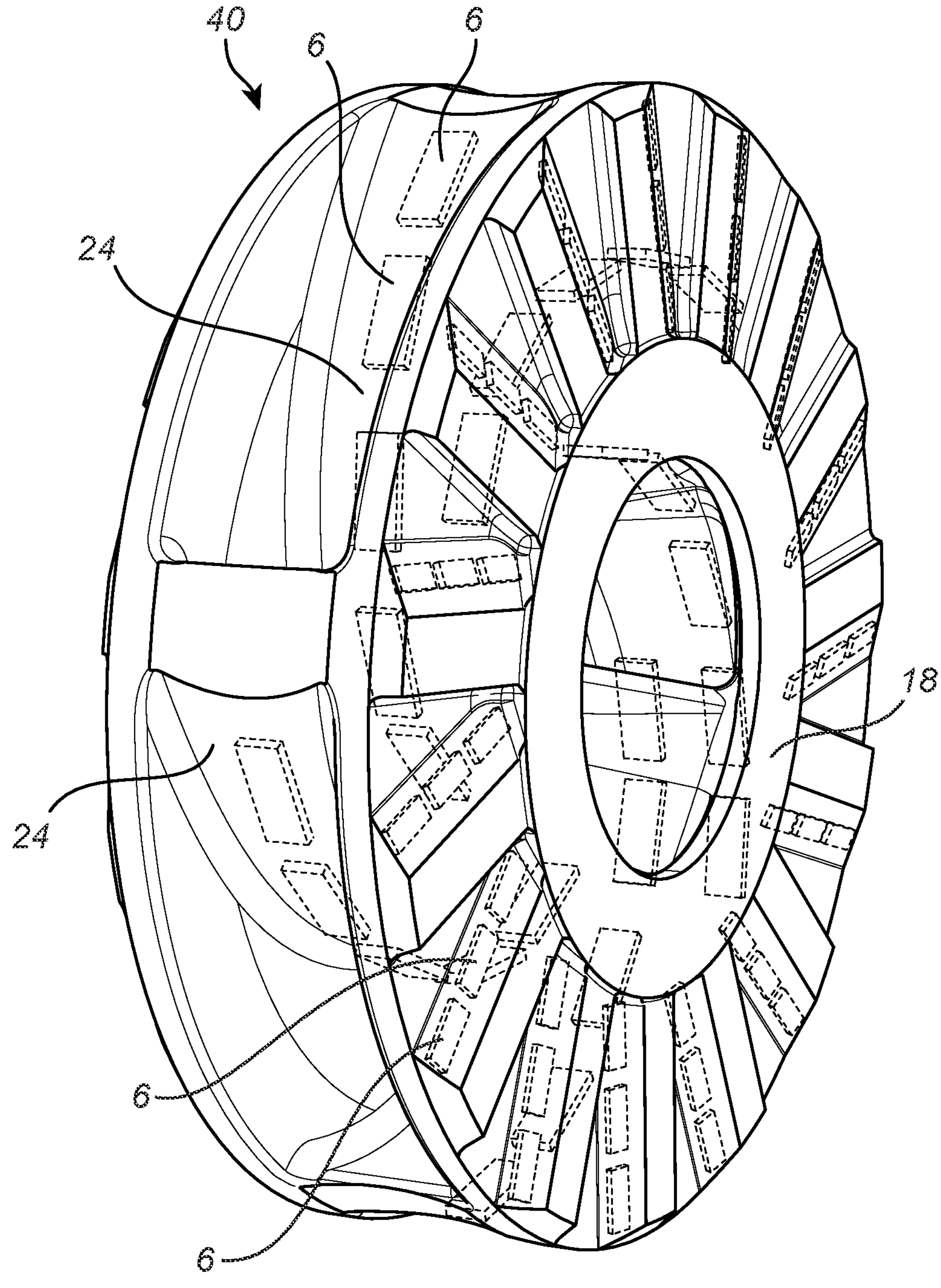
FIG. 4 shows a perspective view of a wear element according to another embodiment of the present disclosure.

FIG. 4 shows a wear element 40 according to an embodiment of this disclosure. In this embodiment, the wear element 40 embodies a pump impeller 40 arrangeable in a slurry pump. The pump impeller 40 here comprises permanent magnets 6 embedded in portions of the pump impeller 40 which are generally susceptible to wear. In this particular embodiment, the permanent magnets 6 are embedded in portions of the front end 18 of the pump impeller 40. The pump impeller 40 further comprises permanent magnets 6 embedded in radially extending inner portions 24 of the pump impeller 40. However, providing permanent magnets 6 embedded in other portions of the pump impeller 40 is also possible within the concept of this disclosure.

The person skilled in the art realizes that the present disclosure by no means is limited to the preferred embodiments described above. On the contrary, many modifications and variations are possible within the scope of the appended claims.

For example, a wear element comprising electromagnets in portions thereof for producing a magnetic field is also possible within the concept of this disclosure, although it is a more laborious solution than that of providing permanent magnets in the wear element.

Further, according to some embodiments, the wear element comprises a composite material. That is, the wear element may be made of a composite material and comprise magnets in at least portions thereof. As an example, the wear element may be made of metal reinforced with ceramic particles. According to another example, the wear element is made of polymer reinforced with ceramic particles. Such ceramic particle reinforcement of the wear element provides increased wear resistance.

Additionally, variations to the disclosed embodiments can be understood and effected by the skilled person in practicing the claimed disclosure, from a study of the drawings, the disclosure, and the appended claims.

The invention claimed is:

1. A wear element for a slurry pump arrangeable in a pump housing, wherein at least a portion of the wear element produces a magnetic field for attracting magnetic particles in a slurry processed by the slurry pump, wherein the wear element comprises one or more permanent magnets in at least portions thereof for producing the magnetic field, arranged such to generate formation of a protective wear layer on a surface of the wear element when used in the slurry pump, and wherein the wear element further comprises a casing liner of a slurry pump.

2. The wear element according to claim 1, wherein the casing liner comprises a peripheral portion and at least one of a front liner and a back liner.

3. The wear element according to claim 1, comprising a pump impeller.

4. The wear element according to claim 1, wherein the wear element is made of metal.

5. The wear element according to claim 1, wherein the casing liner is made of polymer.

6. The wear element according to claim 1, wherein the one or more permanent magnets comprises two or more permanent magnets that are embedded in the wear element and arranged end to end.

7. The wear element according to claim 6, wherein the two or more permanent magnets are arranged with opposing poles facing one another.

8. A wear element for a slurry pump arrangeable in a pump housing, wherein at least a portion of the wear element produces a magnetic field for attracting magnetic particles in a slurry processed by the slurry pump, wherein the wear element comprises one or more permanent magnets in at least portions thereof for producing the magnetic field, arranged such to generate formation of a protective wear layer on a surface of the wear element when used in a slurry pump, and wherein the wear element further comprises a suction liner.

9. A slurry pump comprising:

a pump housing; and a wear element arranged within the pump housing, wherein at least a portion of the wear element produces a magnetic field for attracting magnetic particles present in a slurry processed by the slurry pump, wherein the wear element comprises permanent magnets in at least portions thereof for producing the magnetic field, which magnets are arranged such to generate formation of a protective wear layer on a surface of the wear element when slurry is processed by the slurry pump, and wherein the wear element further comprises a casing liner of a slurry pump and/or a suction liner.

10. The slurry pump according to claim 9, wherein the wear element further comprises a pump impeller.

11. The slurry pump according to claim 9, wherein the wear element is made of polymer and comprises permanent magnets embedded therein, the permanent magnets being arranged end to end with opposing poles facing one another.

12. The slurry pump according to claim 9, wherein the wear element is made of metal and comprises permanent magnets embedded therein, the permanent magnets being arranged end to end with opposing poles facing one another.

13. The slurry pump according to claim 9, wherein the wear element comprises a suction liner and the axial distance between a flange end of the suction liner and a front end of an impeller of the slurry pump, also referred to as the nose gap, prior to use is from 2 to 10 mm.

14. The slurry pump according to claim 9, wherein the pump housing is annular.

15. A method for producing a protective wear layer in a slurry pump comprising the steps of:

arranging a wear element in a housing of the slurry pump, wherein the wear element comprises a casing liner of the slurry pump and/or a suction liner, wherein at least a portion of the wear element produces a magnetic field, and wherein the wear element comprises permanent magnets in at least portions thereof for producing the magnetic field; and pumping a slurry comprising magnetic particles through the slurry pump, whereby magnetic particles of the slurry are attracted by the magnetic field, thereby creating the protective wear layer on a surface of the wear element.

* * * * *